United States Patent
Pan et al.

(10) Patent No.: US 9,891,602 B2
(45) Date of Patent: Feb. 13, 2018

(54) DC THERMOSTAT WITH LATCHING RELAY REPULSING

(71) Applicants: Weidong Pan, Morganville, NJ (US); Michael P. Muench, Canastota, NY (US); Andrew S Kadah, Manlius, NY (US)

(72) Inventors: Weidong Pan, Morganville, NJ (US); Michael P. Muench, Canastota, NY (US); Andrew S Kadah, Manlius, NY (US)

(73) Assignee: International Controls and Measurments Corporation, North Syracuse, NY (US)

( * ) Notice: Subject to any disclaimer, the term of this patent is extended or adjusted under 35 U.S.C. 154(b) by 809 days.

(21) Appl. No.: 14/307,650

(22) Filed: Jun. 18, 2014

(65) Prior Publication Data

US 2015/0370270 A1    Dec. 24, 2015

(51) Int. Cl.
| | |
|---|---|
| F25B 49/00 | (2006.01) |
| B60H 1/00 | (2006.01) |
| F25B 29/00 | (2006.01) |
| G05B 15/02 | (2006.01) |
| G05F 1/46 | (2006.01) |
| G05D 23/19 | (2006.01) |

(52) U.S. Cl.
CPC ......... *G05B 15/02* (2013.01); *G05D 23/1902* (2013.01); *G05F 1/463* (2013.01)

(58) Field of Classification Search
CPC .......... F24F 11/0009; F24F 2011/0052; H01H 47/002

USPC ......... 165/11.1, 253, 259, 127, 131
See application file for complete search history.

(56) References Cited

U.S. PATENT DOCUMENTS

| | | | | |
|---|---|---|---|---|
| 4,645,882 A | * | 2/1987 | Nakayama | H04M 1/2745 361/156 |
| 5,430,600 A | * | 7/1995 | Burns | H01H 47/226 307/141 |
| 5,930,104 A | * | 7/1999 | Kadah | H01H 47/325 361/156 |
| 6,054,891 A | * | 4/2000 | Christiansen | G01R 19/20 327/438 |
| 6,089,310 A | * | 7/2000 | Toth | F24F 11/0009 165/11.1 |
| 6,137,193 A | * | 10/2000 | Kikuoka | H01H 47/002 307/137 |
| 7,298,148 B2 | * | 11/2007 | Drake | G01R 31/3278 324/418 |

(Continued)

*Primary Examiner* — Henry Crenshaw
(74) *Attorney, Agent, or Firm* — Bernhard P. Molldrem, Jr.

(57) ABSTRACT

A thermostat, of the type that employs latching relays to connect thermostat power to the various wires of the thermostat run, has a re-pulse feature that supplies latching pulses at a given interval, e.g., three hours, to ensure that the relays are in their proper state agreeing with the thermostat mode and the room temperature relative to the setpoint(s). In the case that the room air temperature is changing in a manner contrary to the current heating or cooling mode, which may indicate the latching relay has been knocked or bumped and needs to have its proper state re-established, the thermostat microprocessor issues pulses to the latching relay(s) more frequently, e.g., each 30 minutes, and the re-pulses may have a longer pulse width, e.g., increased from 20 ms to 25 ms.

18 Claims, 4 Drawing Sheets

(56) References Cited

U.S. PATENT DOCUMENTS

| | | | |
|---|---|---|---|
| 7,673,809 B2 * | 3/2010 | Juntunen | F23N 5/203 |
| | | | 236/78 A |
| 8,159,320 B2 | 4/2012 | Ruan et al. | |
| 8,587,394 B1 | 11/2013 | Song | |
| 2006/0114635 A1 * | 6/2006 | Laurent | H01H 47/002 |
| | | | 361/160 |
| 2014/0319233 A1 * | 10/2014 | Novotny | G05D 23/19 |
| | | | 236/94 |
| 2015/0370270 A1 * | 12/2015 | Pan | G05F 1/463 |
| | | | 700/276 |

* cited by examiner

DC THERMOSTAT WITH LATCHING RELAY REPULSING

BACKGROUND OF THE INVENTION

The present invention relates to residential heating and/or cooling systems and other indoor comfort systems, and is more particularly concerned with battery-powered thermostats of the type that derive the power for monitoring conditions within the comfort space and for controlling the signaling to the furnace or other comfort system from a battery i.e, dry cells or alkaline cells. The invention is more specifically directed to DC thermostats with latching relays that are pulsed to change their state from OFF to ON or from ON to OFF, and remain latched into that state until pulsed into the other state. Heat may be provided from a gas, oil, or electric furnace or heat pump, and cooling may be provided from a compression/condensation/expansion/evaporation cycle air conditioner, an absorption type air conditioner, a ground-water heat exchange cooing system, or other available chilling apparatus. As used here, the term "cooling" includes both sensible cooling (reducing the temperature of the comfort air) and latent cooling (removing humidity). These comfort air apparatus may have additional functions for better control of the environmental air in the comfort space, such as multiple fan speeds, high and low heating, and high and low compressor speeds.

Wall thermostats are typically installed on an interior wall of a dwelling, business space or other residential or commercial space to control the operation of a furnace, air conditioner, heat pump, or other environmental control equipment. The thermostat continuously monitors the temperature of the room or other interior comfort space or zone, and is connected by a run of thermostat wires to the associated environmental control equipment to signal a call for heating, a call for cooling, or otherwise to keep an interior comfort space parameter, such as temperature, within some range (e.g., 68° F., ±1.0° F.). Other controls may be available, sensitive to other parameters, such as humidity or particulate level.

In the examples discussed here, the thermostats are powered by small dry-cell batteries, e.g., alkaline power cells. However, the re-pulsing action can be used favorably with any other thermostat type as well, including those powered by 24 volt AC thermostat power or any other energy source.

In many applications, i.e., in many permanent homes, and in mobile, recreational, or marine dwellings and spaces, battery-powered thermostats may be the preferred thermostat. These typically have a battery power source, e.g., a pair of AA alkaline power cells, installed within the thermostat housing to power the electronics. These supply DC energy to the internal electronics within the thermostat and power latching relays that connect thermostat power (such as 24 volts AC) to the particular thermostat wires that control heating, fan, air conditioning, and so forth. The thermostat is constantly monitoring the temperature in the comfort space and is also constantly monitoring the voltage level available on the DC battery power source. One or more controls, i.e., push buttons, rotary knob(s) etc., allow the occupant to set and adjust temperature setpoints for heating and/or for air conditioning. An LCD display screen on the housing of the thermostat allows the occupant to see the room temperature and also to see other functions, such as temperature setpoints during a temperature setting sequence. A low-battery message can also be displayed on this screen if the battery voltage drops below a level that indicates the battery is approaching the end of its useful life and should be replaced.

The latch mechanism in most latching relays relies on the magnetic force of the contact to keep the contact latched ON or latched OFF. If the thermostat is bumped, the mechanical shock can sometimes move the contact from the desired state. In that case, the microprocessor in the thermostat continues as if the relay were still in its desired state, but the furnace or air conditioning equipment does not. For example if a low temperature induces the thermostat to issue a call for heat, the microprocessor pulses the latching relay associated with heat to its ON condition, and the relay contact applies AC thermostat power to the W or heat thermostat wire, causing the furnace to commence a heat cycle. Then, if a bump or other shock knocks the contact back to the OFF condition, the furnace will shut down as if the thermostat had been satisfied. Wrong position of the relay could also occur due to a sudden or momentary power supply drop, component degradation, or other reasons that may cause the relay to fail to move to the intended position. Meanwhile, the thermostat heat set point has not been reached, and the microprocessor does not act on the heating relay. With the furnace shut down, the air in the comfort zone continues to cool down, but the thermostat does not respond because the thermostat's call for heat has not been satisfied.

On the other hand, thermal runaway can result if the heat relay contact is bumped into its ON condition when there is no call for heat, as the thermostat microprocessor acts as if the heat relay were open of OFF.

It may be the case that a the above-described erroneous condition will occur when the occupant is away for an extended period, and that the comfort space will continue to cool down until the occupant returns and can correct the thermostat. Failure of the furnace or other HVAC apparatus to cycle properly during winter conditions can result in frozen water pipes or other damage, including temperature stress to indoor plants and pets Because of the foregoing problems, it would be desirable to provide a feature or features for battery powered thermostats that will ensure the relays are properly latched into the proper conditions, and that the heating and/or cooling conditions in the comfort space not be permitted to vary significantly during a heating or cooling operation.

OBJECTS AND SUMMARY OF THE INVENTION

Accordingly, it is an object of the present invention to provide an improvement to a battery powered, i.e., DC thermostat that overcomes the above-mentioned drawback(s) of the prior art.

It is another object to provide an effective means for the thermostat to ensure proper operation when there is a call for heating or cooling, and when the call has been satisfied.

It is yet another object to provide the thermostat with a mechanism to compensate for mechanical interference with the action of the latching relays employed in the thermostat, e.g., mechanical or magnetic bumps, vibrations or shocks.

In accordance with one aspect of the present invention, a thermostat is adapted to be mounted on a wall of a comfort zone within a dwelling or other space or structure, and is adapted to communicate with a comfort air control unit (furnace or air conditioner, for example) that provides heated and/or conditioned air to the comfort zone. The thermostat continuously monitors the temperature of air within the comfort zone. The wall thermostat has a housing, electronic control circuitry within the housing and powered by a DC power source, e.g., a pair of AA power cells, together providing battery power at a battery voltage $V_b$ which may be a nominal 3 volts.

A temperature sensing element in, or on, the housing monitors the room air or comfort zone temperature. A remote temperature sensor may be used in some cases.

A selector mechanism, favorably a set of selector push buttons, is or are configured to permit the occupant to adjust the temperature setpoint of the thermostat. In some possible embodiments, the user may employ a remote computer or a hand-held device, such as a smart phone or tablet to adjust the setpoints on the thermostat.

An LCD display or equivalent display panel on the housing is configured so as to show the temperature within the comfort zone and the temperature setpoint(s) for heating and/or cooling, and includes a feature for providing a low battery alert message. This latter may be a display of the words "LOW BATT" presented on a portion of the screen, and may flash on and off. Alternatively, the low-battery alert display may be a flashing LED on the housing near the LCD screen.

A microprocessor within the thermostat housing is configured or adapted to control actuation of the comfort air apparatus when the comfort space temperature drops to (or rises to) the temperature setpoint and to control deactuation of comfort air apparatus when the comfort air temperature changes from the setpoint by a predetermined swing amount (e.g., ±½ degree to ±3 degrees). The microprocessor has power terminals connected with the DC power source; one or more input terminals connected with the temperature sensing element; one or more display output terminals connected with said display; and at least a first pair of relay output terminals.

To apply the thermostat power to the wires of the thermostat wire run, the thermostat has at least one latching relay having ON and OFF inputs connected to respective ON and OFF outputs terminals of the at least one pair of output terminals of the microprocessor. Each such latching relay has a contact mechanism to connect thermostat power to one wire of the thermostat wires in response to a pulse from one output terminal of said pair of output terminals and to disconnect thermostat power from that one wire in response to a pulse from the other output terminal of the at least one pair of output terminals. Normally the latching relay stays latched in the one condition until it is pulsed again to the other position.

The battery-powered thermostat's microprocessor typically has a battery voltage monitoring functionality to compare the battery voltage $V_b$ of the DC power source with one or more predetermined low-voltage threshold levels and to actuate the low-battery alert message on the display panel when the battery voltage $V_b$ drops from its nominal 3 volts to or below the low-voltage threshold, e.g., 2.4 volts.

Besides this, the microprocessor may include a temperature setpoint altering functionality operative when the battery voltage $V_b$ drops to or below one of these one or more voltage thresholds to change one of the setpoint selected earlier by the occupant (e.g., raising the heating setpoint from 68° to 69°) or the swing amount, e.g. (increasing the swing from ½° to 2°) thereby increasing the cycle time between actuation and deactuation of the comfort air apparatus. This reduces the frequency of pulsing of the latching relays, thus reducing the amount of battery energy draw and thereby prolonging the remaining service life of the DC power source.

Additional latching relays in the thermostat are associated with the thermostat wires for fan speed, second-level heat, second-level compressor, etc. Each of these is switched from ON to OFF or from OFF to ON in response to a pulse from an output terminal port of an additional pair of output terminal ports of the microprocessor.

An abnormal heating or cooling event can be detected by the microprocessor based on an unusually high time rate of change of temperature (dT/dt), and/or excessively high or low temperature of air in the comfort space. The comfort zone may also fail to warm up to the set point during a call for heat, or fail to cool down to the cooling setpoint during a call for cooling. These conditions may result from an inability of the associated latching relay to switch ON (or OFF) owing, for example, to insufficient electrical energy in the power cells of the DC power supply. The thermostat microprocessor can accommodate this, to at least a limited degree, by re-pulsing the thermostat relays periodically, or if needed by increasing the pulse width of the signal sent to the relay, from a typical 20 milliseconds to somewhat lengthened 25 milliseconds to boost the pulling force of the relay coil.

Also, it may be that the latching relay has de-latched from its intended condition, due to mechanical shock or some other reason. Re-pulsing the relays in the same sense, i.e., ON during a heat cycle or OFF when there is no call for heat, will ensure that the latching relays do not remain in their unintended state indefinitely.

According to an aspect of the present invention, the microprocessor that is contained within the thermostat housing is adapted to control actuation of the furnace, air conditioner, or other comfort air apparatus to issue a call for heating or cooling when the comfort space temperature reaches a temperature based on the temperature setpoint. Likewise, the microprocessor controls deactuation of the comfort air apparatus when the comfort air temperature changes from said temperature setpoint by a predetermined swing amount (e.g., one-half degree to a few degrees) to end the call for heating or cooling.

The microprocessor has power terminals connected with the battery DC power source, one or more input terminals connected with the thermostat temperature sensing element, one or more output terminals connected with the thermostat display, and one or more pairs of output terminal ports associated with respective ones of the latching relays of the thermostat.

Each latching relay has an ON input and an OFF input connected respectively to output ports of the at least one pair of output terminal ports of the microprocessor Each of the latching relays having a contact mechanism to connect thermostat power to one wire of the run or set of thermostat wires in response to a pulse from one output terminal port of said pair of output terminal ports. The contact acts to disconnect thermostat power from that one thermostat wire in response to a pulse from the other output terminal port of that pair of output terminal ports.

In order to ensure reliability and guard against misactuation, for example due to bumping vibrations or mechanical shocks, the microprocessor further incorporates a re-pulsing functionality. The repulsing is operative to sense if a call for heating or cooling is present and if so to issue pulses from said one output terminal port to the ON input of the associated latching relay at a predetermined interval and at a predetermined pulse width, and if a call for heating or cooling is absent to issue pulses from the other output terminal port to the OFF input of the associated latching relay at a predetermined interval and at a predetermined pulse width. This is favorably carried out at a long interval, e.g., one re-pulse each 180 minutes, unless an unusual heating or cooling situation is detected.

The thermostat is also sensitive to whether the heating or cooling is going in the opposite direction to the call for heating or cooling, or if heating or cooling seems to continue when the setpoint has been reached and the call for heat or call for cooling should have ended. To this end, the microprocessor further includes a functionality operative, when there is a call for heating present and the comfort space temperature is below the temperature setpoint, to provide pulses from the one output terminal to the ON input of the latching relay at a predetermined time interval shorter than the first-mentioned predetermined interval, e.g, at 20 minute intervals. On the other hand, if the call for heating has ended and the microprocessor senses that heating is continuing, the microprocessor may send a pulse at the shorter interval to the OFF input of the latching relay. Favorably, the shorter re-pulsing interval in this situation may be about twenty minutes.

In a similar manner, when there is a call for cooling present and comfort space temperature remains above the cooling temperature setpoint, the microprocessor may provide pulses from the one output terminal to the ON input of the latching relay at a predetermined time interval shorter than the first-mentioned predetermined interval, e.g., a twenty-minute interval. The thermostat microprocessor may also provide re-pulsing if the temperature is sensed as increasing during a cooling cycle, i.e., if the time rate of change of temperature is opposite of what would be expected for a cooling cycle. Likewise, the microprocessor can provide re-pulsing at this rate to the OFF terminal of the cooling latching relay when the call for cooling is ended and the thermostat detects that the comfort space is continuing to cool down.

The microprocessor may further including an additional functionality operative, when there is a call for heating present and comfort space temperature is below said temperature setpoint, to provide pulses from the one output terminal to the ON input of the latching relay at a predetermined time interval shorter than the first-mentioned predetermined interval, and to provide said pulses at a width increased over said predetermined pulse width, e.g., increasing the normal pulse width of 20 milliseconds to 25 milliseconds, go give the relay coil an additional "kick" to help move the relay contact if it is stuck in the wrong position.

With the preferred embodiment of the thermostat, in the event that after a re-pulsing the temperature conditions within the comfort space do not seem to have been corrected, the microprocessor can issue second and subsequent re-pulses using pulses of the increased pulse width to provide additional energy to the relay coil. In this case, the microprocessor may lengthen the pulse width from a normal pulse width or 20 milliseconds to a pulse width of 25 milliseconds. That is, when there is a call for cooling present and comfort space temperature remains above the temperature setpoint but with the room temperature increasing instead of decreasing, the microprocessor re-pulses the ON input of the latching relay at a predetermined time interval shorter than the first-mentioned predetermined interval (20 minutes rather than 180 minutes), and provides the re-pulse pulses at the increased (25 millisecond) pulse width. When a heating cycle is ended and there is no call for heating present but the comfort space temperature is above said temperature setpoint and continues rising after a first re-pulsing, the microprocessor provides a re-pulse to the OFF input of the heating latching relay at the predetermined time shorter (20 minute) interval shorter and at a the increased pulse width (25 milliseconds).

Likewise, if a call for cooling has ended, but the comfort space temperature remains below the setpoint and continues to cool down after a first re-pulsing the microprocessor provides re-pulses from to the OFF input of the cooling latching relay at the shorter (20 minute) interval and at the increased (25 millisecond) pulse width. When there is a call for heating present and comfort space temperature remains below the temperature setpoint and continues to cool down after a first re-pulse of the associated relay, the thermostat microprocessor provides further re-pulse pulses to the ON input of the heating latching relay and to the OFF input of the cooling latching relay, both at the shorter (20 minute) interval and at increased pulse width (25 milliseconds).

Typically, many latching relays are present in the thermostat, and so re-pulsing of a relay should be taken here to mean re-pulsing several or all of the various latching relays, in most cases.

The above and other objects, features, and advantages of this invention will be better understood from the ensuing description of a preferred embodiment, which is to be read in connection with the accompanying Drawing.

DETAILED DESCRIPTION OF THE PREFERRED EMBODIMENT

Figure 1:
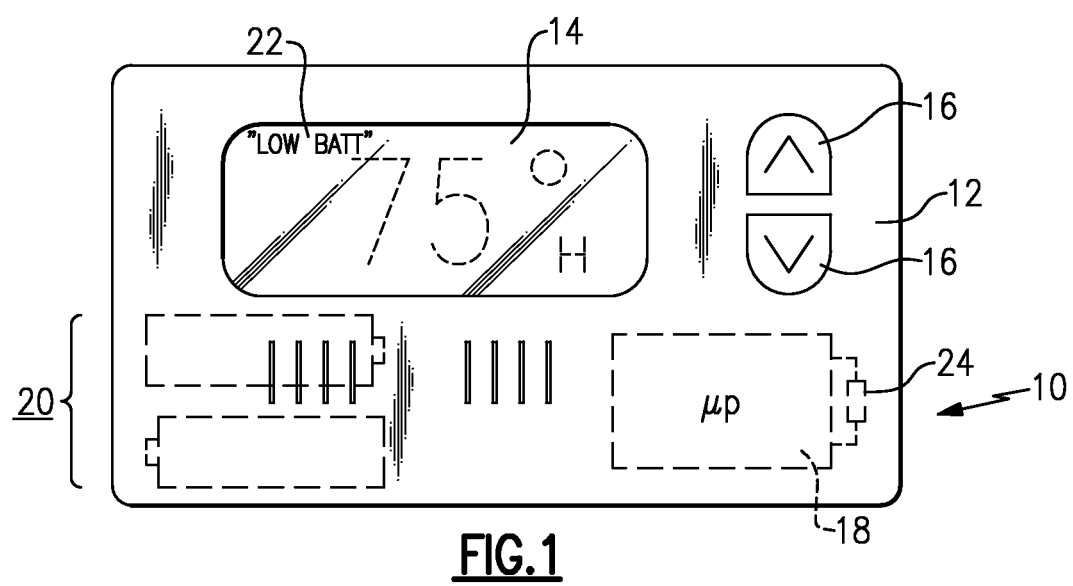
FIG. 1 is a front view of a DC thermostat of an embodiment of this invention.

With reference now to the Drawing, FIG. 1 shows a battery-powered thermostat 10 which, as shown here, has a housing or case 12 with an LCD display 14 for showing temperature, temperature set-points, and thermostat settings. There are also manual controls, here in the form of up-down push buttons 16, 16, for adjusting temperature setpoints, for example. In some versions there can be more than the two push buttons, or the controls can be virtual, i.e, where the display 14 is in the form of a touch screen. It is possible also for some thermostats to permit the occupant to change the settings remotely, e.g., with a personal computer, smart phone, or tablet. In this version, both control buttons 16 are depressed simultaneously to enter a control mode, and later to exit back to run mode. In this thermostat 10, a microprocessor 18 stores thermostat settings, including for example set-point for heating and a set-point for air conditioning. These may be entered by the technician or installer at the time the thermostat is installed, and later can be changed by the owner or other occupant. DC battery power is supplied from a battery 20, here shown schematically as being comprised of a pair of AA size power cells. In some thermostats, three or more cells may be required, or a different size cell, e.g., AAA, may be employed. The microprocessor 18 continuously monitors the battery voltage $V_b$. In this embodiment, the initial battery voltage is a nominal 3.0 volts, but the battery voltage $V_b$ decreases gradually over the life of the power cells. When the battery voltage $V_b$ drops to a predetermined low-battery threshold, e.g., 2.4 volts, the microprocessor may actuate a LOW BATT indication 22 to provide a visual alert message to the occupant when the battery voltages drops to or below that threshold. FIG. 1 also shows a solid-state temperature sensor 24 coupled with the microprocessor, so that the microprocessor 18 can continuously monitor the temperature in the comfort space in which the thermostat is mounted.

Figure 2:
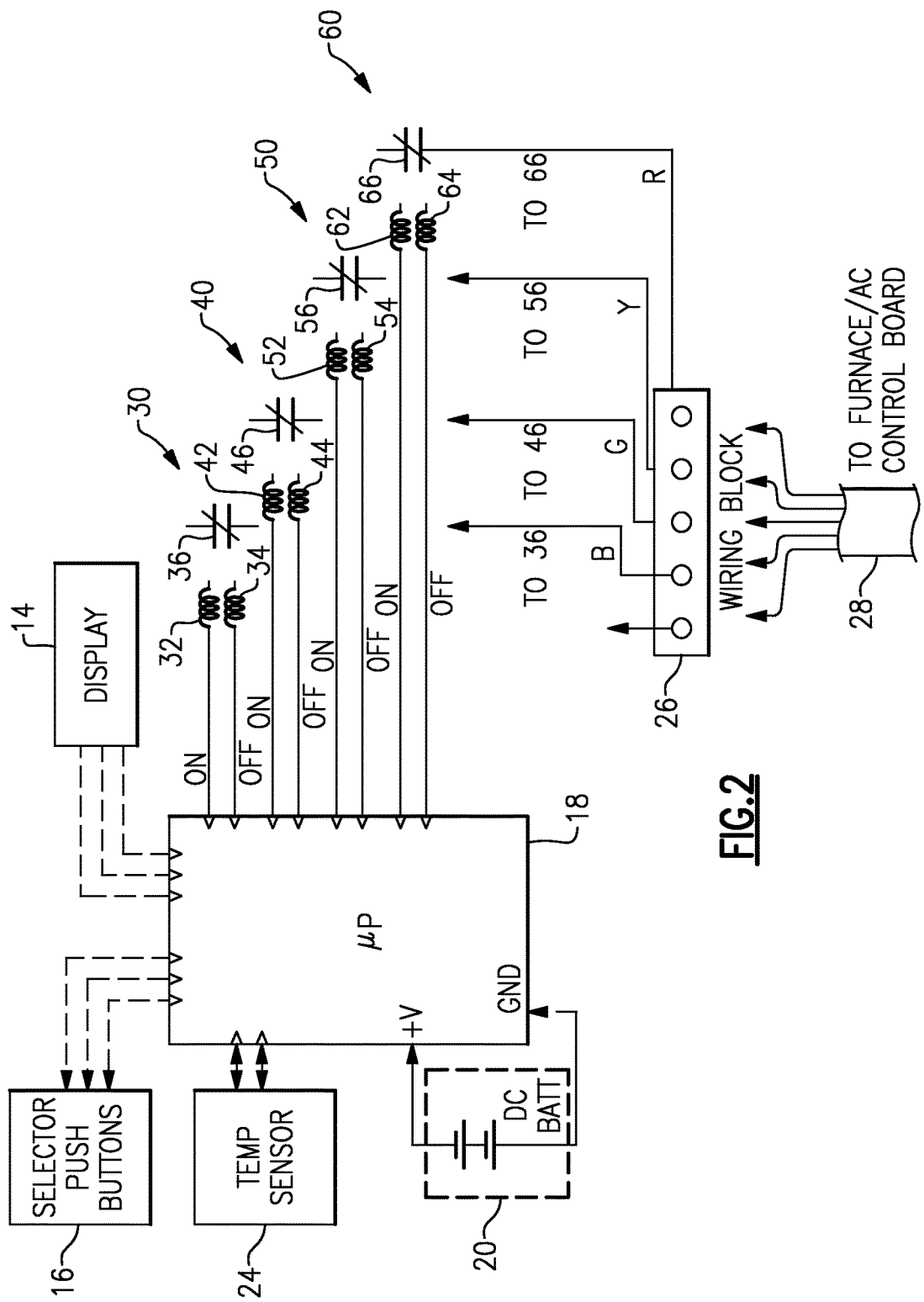
FIG. 2 is a schematic view of the DC thermostat of this embodiment.

Some details of the thermostat 10 are illustrated schematically in FIG. 2. Here, the microprocessor 18, which is favorably an integrated circuit with multiple output and input terminals, has power ports +V and Gnd connected to positive and negative terminals of the DC voltage source 20, and the microprocessor 18 is configured to have a battery voltage monitoring functionality 21 therein, for continuously monitoring the battery voltage $V_b$, and the microprocessor executes a battery-life prolonging action if the battery voltage drops below a low-battery threshold or takes some additional action if the battery voltage $V_b$ drops below a second low-battery threshold. The thermostat select buttons are coupled to input terminals of the microprocessor, and the display module 14 is coupled to output terminals of the microprocessor 18. The microprocessor 18 has input terminal ports connected with the temperature sensor 24, and has a number of pairs of output terminal ports connected with respective latching relays 30, 40, 50 and 60 provided for controlling heating, fan operation, air conditioning, and high-low fan speed, respectively. There may be more or fewer latching relays, depending upon the operation of the HVAC comfort air apparatus, which may include a furnace and/or air conditioner, heat pump, and may have second-level heating, second-level air conditioning, or other features.

In this illustrated embodiment, the heating latching relay 30 has a first relay coil 32 that is coupled to an ON output terminal of the microprocessor and a second relay coil 34 that is coupled to an associated OFF output terminal. These relay coils may each include a driver, e.g., a transistor coupled to the coil, which is not shown in this view for the sake of simplicity. When the microprocessor sends a pulse to energize the relay coil 32, the relay coil 32 will pull an associated relay contact 36 to a closed or ON condition, and connect 24 volt AC thermostat power to a heating wire, i.e., a white or W wire connection at the thermostat wiring block 26, This provides a call for heat along the corresponding wire of the thermostat wire bundle 28 to cause the furnace to go through a heating cycle. When the microprocessor, comparing the output of the sensor 24 with the stored temperature setpoint, determines that the thermostat has been satisfied, the microprocessor 18 sends an OFF pulse to the other relay coil 34 of the latching relay, which then de-latches the contact 36 and pulls it to its open or OFF position. The temperature at which the thermostat is satisfied may typically be 1 degree to 3 degrees above the heating setpoint. The difference between setpoint and the satisfaction temperature, i.e., temperature swing, may be programmable in the microprocessor. A thermostat run or wire bundle 28 extends from the thermostat wiring bundle to the furnace/air-conditioning room comfort apparatus (not shown). The microprocessor 18 actuates the other latching relays 40, 50, 60 etc. in a similar fashion.

A fan relay 40 is shown here with fan relay coils 42 and 44 coupled to respective ON and OFF output ports of the microprocessor 18 for latching fan relay contact on and off, respectively to provide thermostat power to a fan wire G (green) for fan-only operations. An A/C or compressor relay 50 has its relay coils 52 and 54 coupled to respective output ports of the microprocessor 18 to closing and opening the associated air-conditioning relay contact 56 and connecting thermostat power to the air-conditioning wire Y (yellow), and disconnecting the thermostat power when the room air has cooled down to satisfy the thermostat. An additional relay 60, here a fan-speed relay, has relay coils 62 and 64 that are connected respectively to output terminals of the microprocessor 18, and these coils are pulsed respectively to close and open the relay contact 66 to switch on and off thermostat power to the associated fan-speed thermostat wire BLUE. There can be other latching relays in the thermostat to control additional furnace/air-conditioning/heat pump functions, such as second-stage heat or second-stage cooling. For example, a blue/orange wire may be present for second-stage cooling and a white/blue wire for second-stage heating.

Figure 3:
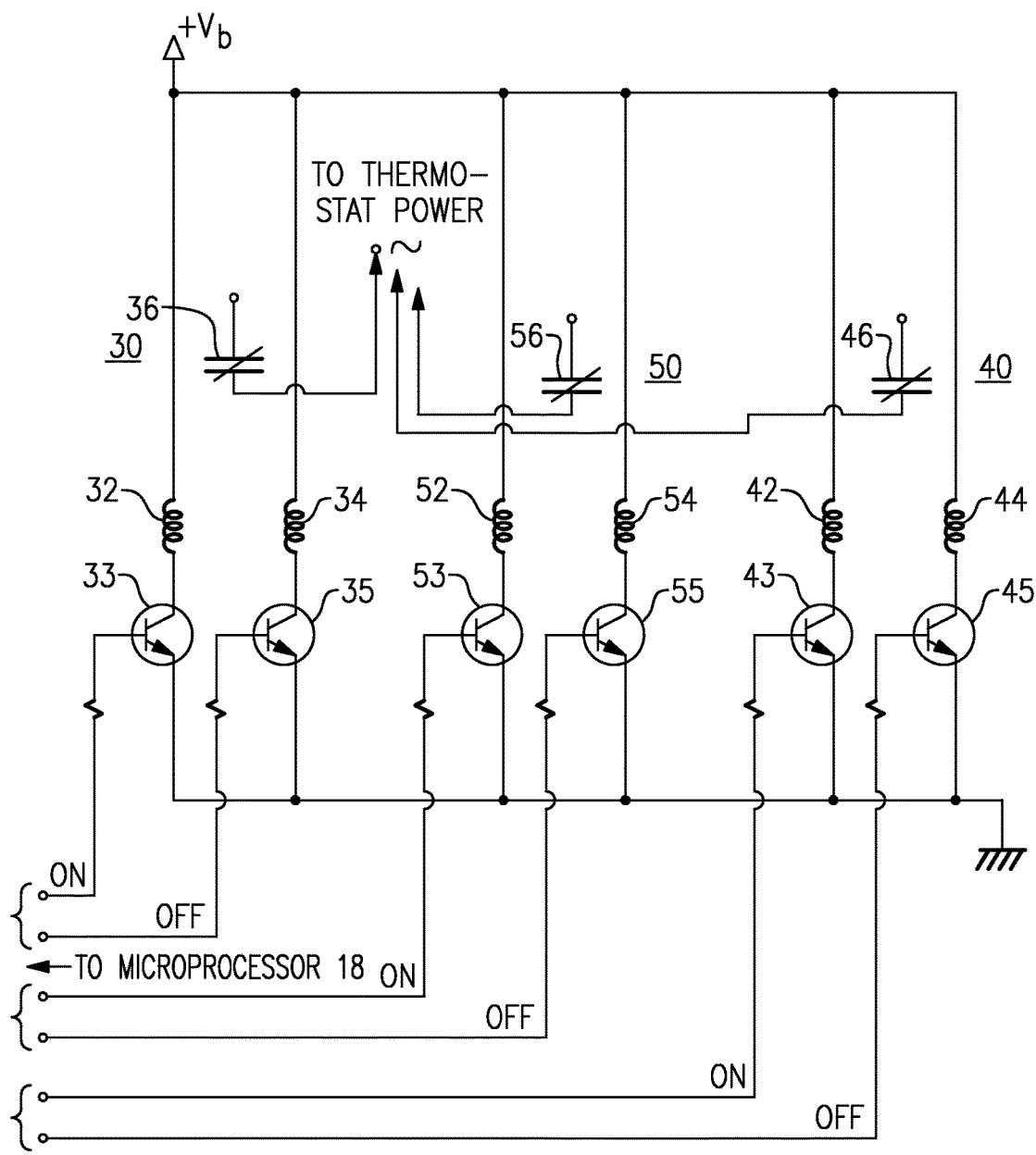
FIG. 3 is a schematic electrical diagram of the latching relay arrangement employed in this embodiment.

FIG. 3 is a general schematic of the latching relay arrangement that may be employed within the thermostat 10. Here three individual latching relays 30, 40, 50 are combined in a single package. Of course a different package could contain more latching relays, or an additional package of three could be installed in the thermostat to control additional functions, as needed.

Each relay contact 36, 46, 56 is connected with its respective heat wire W, fan wire G or cooling wire Y. When one of the associated relay coils is pulsed, the latching contact is held in its open or closed state until latched the other way when the opposite relay coil is pulsed. For example if the microprocessor issues a call for heat, the microprocessor pulses the coil 32 with a DC pulse of approximately 20 milliseconds. In this embodiment, the pulse is supplied to the base electrode of a switching transistor 33 whose collector is connected with the coil 32. The transistor 33 issues a brief pulse of current into coil 32 which closes the contact 36, and the contact remains latched into the closed condition, supplying thermostat power on the W wire. The heating relay remains closed until the thermostat is satisfied and the microprocessor sends a pulse to the base of another transistor 35 whose collector is connected with the relay coil 34. A resulting current pulse through the coil 34 delatches the relay contact 36 and moves it to the OFF or open position. The contact remains latched open until there is another call for heat.

Similarly, the fan relay 40 has driver transistors 43 and 45 for its relay coils 42 and 44 for closing and opening the associated fan relay contact 46, and the air-conditioning latching relay 50 has driver transistors 53 and 55 for its relay coils 52 and 54 for closing and opening the air conditioning relay contact 56.

Additional latching relays may be included for second level heat, second level cooling, fan speed or other heating, cooling or air-conditioning functions.

Many different configurations and styles of latching relays are available, and this invention is not limited only to one or another type of latching relay.

In some cases, especially if battery voltage $V_b$ becomes low, a given relay contact may fail to latch when the associated relay coil is actuated. The thermostat microprocessor may detect that the room air temperature fails to satisfy the thermostat after a call for heating or after a call for cooling, and if that occurs, the microprocessor may re-pulse the associated relay coil, and in some cases may increase the pulse width, e.g., from 20 msec to 25 msec to ensure actuation.

Each relay actuation, i.e., each time that current is fed to the relay coils to switch the relay closed or open, there is an expenditure of electrical energy from the battery power source 20. Eventually, normal thermostat operations will drain the power from the power cells and cause the battery voltage $V_b$ to drop. Typically, battery life in a battery-powered thermostat is one year or slightly over, and the occupant is advised to change the thermostat batteries annually. However, as often as not the occupant fails to change the thermostat batteries, and the available battery voltage will continue to drop until the thermostat can no longer function reliably. Depending on remaining battery voltage, the microprocessor may disable the function for lengthening the pulse width so as to help prolong the remaining battery life.

In normal thermostat operation, a fresh pair of power cells has a battery voltage level $V_b$ of a nominal 3.0 volts, but this level decreases over time. At about one year of operation, the battery voltage continues to drop and reaches a low-voltage threshold (shown at point a), e.g., 2.4 volts. At this point, the display panel 14 presents the LOW BATT alert message 22. This is intended to alert the occupant that the battery levels are low and that he or she should replace the existing power cells with fresh power cells. However, as long as the heating and cooling operations continue normally, there is nothing inducing the occupant to look at the thermostat and to check on the settings, so he or she may not notice the LOW BATT message for several weeks. Re-pulsing, as described here, will help ensure that the latching relays go to their intended state, or return to it, even when the battery voltage begins to decay.

In the thermostat arrangement of some embodiments, as the microprocessor continues to monitor the battery voltage $V_b$, when the battery voltage continues to decay down to a second, lower low-battery threshold, e.g., 2.2 volts, the microprocessor 18 changes the temperature setpoints, e.g., changing the heat initiation setpoint down from 68° to 67° F., or changing the cooling initiation setpoint upward from 74° to 75° F. This changes the cycle time for heating or cooling and reduces the number of heating cycles per day, which thus reduces the number of times that the relay coils need to be pulsed. At the same time, when the voltage is below the second low-battery threshold, the microprocessor will no longer actuate any of the additional functions, such as second level heat, second level cooling, fan speed, etc., and none of the additional relays associated with those additional functions are actuated, which reduces the drain on the remaining battery life. Thus, the battery voltage decays at a slower rate. After that, if the battery voltage $V_b$ continues to decay to a third low-battery voltage threshold, for example 2.1 volts, the microprocessor can change the temperature setpoints by an additional amount, e.g., reducing from 67° to 65° F. for heating and increasing from 75° to 77° for cooling. Preferably, the satisfaction setpoint temperatures remain the same, so there is an increased temperature swing in the heating (or cooling) cycle. This will reduce the rate at which battery power is used for pulsing the relay coils, and will somewhat further extend the battery life.

The resulting change in heating or cooling cycles is usually noticeable to the occupant when present in the dwelling or other comfort zone, and this will induce him or her to check the thermostat settings. When that occurs, the occupant will have reason to notice the LOW BATT alert message 22, and will be prompted to change the power cells for fresh power cells. When that occurs, the normal battery voltage $V_b$ level from the fresh cells will immediately return the thermostat to the normal operations, and return the temperature setpoints to their level before the low battery condition.

As an alternative to changing the temperature setpoints when the battery voltage $V_b$ falls below the low-voltage threshold, the thermostat microprocessor 18 may instead alter the swing amount, i.e., the temperature difference between a call for heating (or cooling) and thermostat satisfaction. This may involve changing the swing amount from the usual 1° to perhaps 2° or 3°.

The change in setpoint or temperature swing will usually be noticeable and may provide below optimum comfort conditions within the comfort zone, but will prolong thermostat operations significantly at the end of battery life, and may help avoid damage such as freezing water pipes, or temperature stress to household plants and pets.

Figure 4:
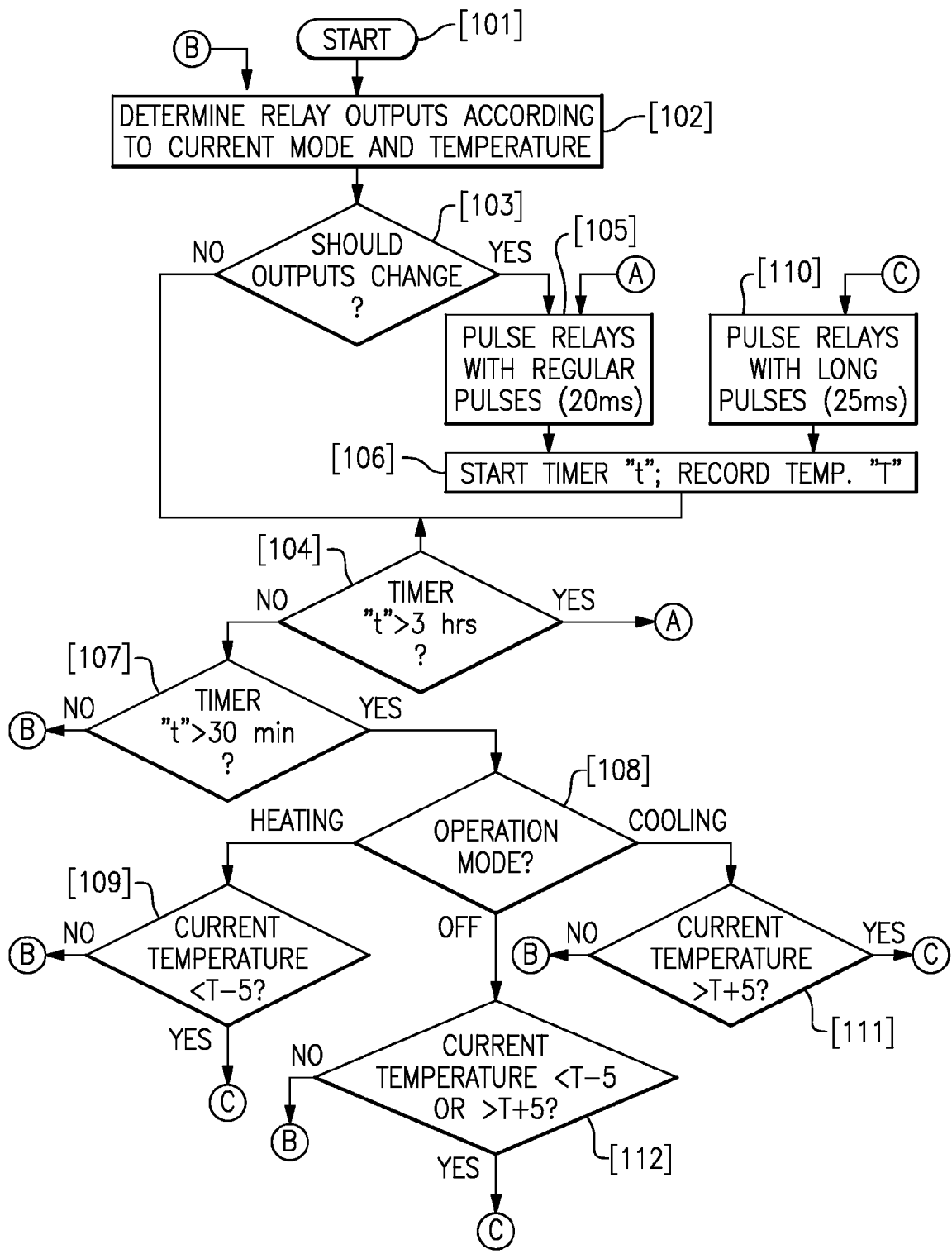
FIG. 4 is a process diagram for explaining the re-pulsing strategy executed in accordance with and example of this invention.

The re-pulsing strategy employed by the microprocessor 18 can be explained in reference to the chart of FIG. 4.

The thermostat employs its temperature sensing and clock timing features to re-pulse the relays as necessary to maintain proper actuation. The thermostat is constantly sensing temperature T within the comfort space, and is also providing clock timing. The thermostat microprocessor has stored values for heat initiation and satisfaction setpoints and for cooling initiation and satisfaction setpoints.

The program starts when the thermostat begins to operate (block [101]) and then runs continuously. The relay outputs from the microprocessor 18 are set depending on the mode (heating, cooling, or off) and the temperature T sensed within the comfort space as compared with the relevant temperature setpoint (block [102]).

The room temperature is checked against the relevant setpoint (block [103]). If there is no change in mode, and the temperature indicates that neither the initiation setpoint nor the satisfaction temperature setpoint of the current mode has been reached, and the microprocessor outputs should not change.

The microprocessor 18 checks elapsed time to count up to 180 minutes, i.e., three hours (block [104]). When three hours have expired (see path connector A) the microprocessor provides a standard pulse, e.g. with a pulse width of 20 milliseconds (block [105]), which re-actuates the latching relays in the same sense as matches the operating mode and room temperature. After this, the microprocessor resets the timer to re-start timing and records the current room temperature T (block [106]).

Returning to block [103], if there is a change such as a new call for heat or satisfaction of temperature, and the outputs of the latching relay(s) need to change, the microprocessor pulses the relay(s) with the regular width pulses (block [105]) and restarts the timer and records the room temperature T (block [106]).

The balance of the program illustrated in FIG. 4 addresses any unusual temperature behavior, such as a failure of the HVAC equipment to respond to a call for heating or cooling, or failure of the equipment to shut down when the satisfaction setpoint has been reached.

The microprocessor checks whether a shorter time interval, e.g., 30 minutes, has elapsed (block [107]), and if not, the process follows path connector B so that the process takes steps of blocks [102] to [106] as discussed previously.

Each time the timer reaches t=30 minutes (in this example), the microprocessor checks the operating mode for heating, cooling or off (block [108]).

If the system is in the heating mode, the microprocessor checks whether the current temperature in the comfort space has dropped below some temperature less than the recorded temperature T (as recorded in block [106]), e.g., by five degrees or more (block [109]). If not, the process takes path connector B and follows blocks [102] to [106], as normal.

However, if the microprocessor determines that the comfort space temperature has dropped more than, e.g., five degrees below the recorded temperature T, the process takes path connector C, and the microprocessor re-pulses the appropriate relay(s) (block [110]). This re-pulsing occurs at the shorter time interval, e.g., 30 minutes versus 180 minutes, and may employ longer pulse-width pulses, e.g., 25 milliseconds. This ensures a greater energy in each pulse to provide a boost in magnetic force to move the relay contact to its proper state in these situations.

In a similar fashion, if the system is in a cooling mode (block [111]) and the current temperature is below the sum of the recorded temperature T and a predetermined temperature offset, e.g., five degrees, path connector B is taken and the normal process steps of blocks [102] to [106] is followed. Otherwise, if the temperature rises from the recorded temperature T during a cooling cycle by more than that amount, e.g., greater than T+5, the process takes path connector C, and then re-pulses at the shorter interval and with longer pulse width pulses (block [110]), then re-starting the timer t and re-recording the room temperature or comfort space temperature T.

In the event the system is in the off mode (block [112]), as long as the current temperature remains within a range of, for example, five degrees below the recorded temperature T to five degrees above it, the path. connector B is taken, and normal, three hour re-pulsing is employed according to blocks [102] to [106]. However, if the current temperature of the comfort space goes outside this range, e.g., below T−5 or above T+5, then path connector C is taken, and the more frequent and longer pulses are applied to the latching relays, following the process of blocks [110] and [106].

Although this example uses the specific times of re-pulsing, e.g., 180 minutes and 30 minutes, these times can be selected to different values. For example, re-pulsing could be at 20 minute intervals. Also, the regular and longer pulses, shown here at 20 ms and 25 ms, could be selected at other values. Moreover, the re-pulsing as shown here results from the room temperature being more than some offset, such as 5 degrees, from the recorded room temperature T. However, as similar result could be attained by employing the time rate of change of comfort space temperature, and re-pulsing according to block [110] when the time rate of temperature change is inappropriate for the mode of the HVAC system.

As mentioned earlier, the invention is not limited only to battery powered thermostats of the type specifically shown in the preferred embodiment. The re-pulsing of relays can be employed to advantage in thermostats powered by 24 volt AC thermostat power or by household AC power, either through rechargeable permanent batteries or used directly, through an inverter, to supply power to the thermostat electronics. This invention can apply to any thermostat regardless of power source. Also, the colors discussed in connection with the thermostat wire run are only for sake of example. Different wiring conventions may employ different color coding for the various thermostat wires.

While the invention has been described with reference to specific preferred embodiments, the invention is certainly not limited to the precise embodiments as described and illustrated here. Rather, many modifications and variations will become apparent to persons of skill in the art without departure from the scope and spirit of this invention, as defined in the appended claims.

We claim:

1. Wall thermostat adapted to be mounted on a wall of a comfort space and coupled by a set of thermostat wires to a comfort air apparatus that provides heated or cooled air to said comfort space when the temperature of air in said comfort space reaches a temperature setpoint selected by an occupant of said comfort space; and comprising
 a housing adapted to be mounted on the wall of said comfort space;
 a temperature sensing element in or on said housing;
 a selector mechanism configured to permit the occupant to adjust said temperature setpoint;
 a DC power source within said housing providing DC power at a battery voltage $V_b$;
 a display on said housing;
 a microprocessor within said housing adapted to control actuation of said comfort air apparatus to issue a call for heating or cooling when the comfort space temperature reaches a temperature based on said temperature setpoint and to control deactuation of said comfort air apparatus when the comfort air temperature changes from said temperature setpoint by a swing amount to end said call for heating or cooling;
 said microprocessor including
  power terminals connected with said DC power source;
  one or more input terminals connected with said temperature sensing element;
  one or more output terminals connected with said display; and
  at least a first pair of output terminal ports;
 at least one latching relay having ON and OFF inputs connected respectively to respective output ports of said at least one pair of output terminal ports of the microprocessor, said latching relay having a contact mechanism to connect thermostat power to one wire of said set of thermostat wires in response to a pulse from one output terminal port of said pair of output terminal ports and to disconnect thermostat power from said one wire in response to a pulse from the other output terminal port of said at least one pair of output terminal ports;
 said microprocessor further including a re-pulsing functionality operative to sense if a call for heating or cooling is present and if so to issue pulses from said one output terminal port to the ON input of the associated latching relay at a predetermined interval and at a predetermined pulse width, such that the relay remains latched or if the relay has inadvertently de-latched the relay is pulsed back to its latched ON condition; and if a call for heating or cooling is absent to issue pulses from the other output terminal port to the OFF input of the associated latching relay at a predetermined interval and at a predetermined pulse width, such that the relay remains de-latched or if the relay has inadvertently latched ON the relay is re-pulsed back to its latched OFF condition.

2. The wall thermostat according to claim 1, wherein said predetermined interval is at least 60 minutes.

3. The wall thermostat according to claim 2, wherein said predetermined interval is substantially 180 minutes.

4. The wall thermostat according to claim 1, said microprocessor further including a functionality operative, when there is a call for heating present and comfort space temperature is below said temperature setpoint, to provide pulses from said one output terminal to the ON input of the latching relay at a predetermined time interval shorter than the first-mentioned predetermined interval.

5. The wall thermostat according to claim 4 wherein said predetermined time interval is substantially 20 minutes.

6. The wall thermostat according to claim 1, said microprocessor further including a functionality operative, when there is a call for cooling present and comfort space temperature is above said temperature setpoint, to provide pulses from said one output terminal to the ON input of the latching relay at a predetermined time interval shorter than the first-mentioned predetermined interval.

7. The battery powered wall thermostat according to claim 6 wherein said predetermined time interval is substantially 20 minutes.

8. The wall thermostat according to claim 1, said microprocessor further including a functionality operative, when there is no call for heating present and comfort space temperature is above said temperature setpoint, to provide pulses from said other output terminal to the OFF input of the latching relay at a predetermined time interval shorter than the first-mentioned predetermined interval.

9. The wall thermostat according to claim 1, said microprocessor further including a functionality operative, when there is no call for cooling present and comfort space temperature is below said temperature setpoint, to provide pulses from said other output terminal to the OFF input of the latching relay at a predetermined time interval shorter than the first-mentioned predetermined interval.

10. The wall thermostat according to claim 1, said microprocessor further including a functionality operative, when there is a call for heating present and comfort space temperature is below said temperature setpoint, to provide pulses from said one output terminal to the ON input of the latching relay at a predetermined time interval shorter than the first-mentioned predetermined interval, and to provide said pulses at a pulse width increased over said predetermined pulse width.

11. The wall thermostat according to claim 1, said microprocessor further including a functionality operative, when there is a call for cooling present and comfort space temperature is above said temperature setpoint, to provide pulses from said one output terminal to the ON input of the latching relay at a predetermined time interval shorter than the first-mentioned predetermined interval, and to provide said pulses at a pulse width increased over said predetermined pulse width.

12. The wall thermostat according to claim 1, said microprocessor further including a functionality operative, when there is no call for heating present and comfort space temperature is above said temperature setpoint, to provide pulses from said other output terminal to the OFF input of the latching relay at a predetermined time interval shorter than the first-mentioned predetermined interval, and to provide said pulses at a pulse width increased over said predetermined pulse width.

13. The wall thermostat according to claim 1, said microprocessor further including a functionality operative, when there is no call for cooling present and comfort space temperature is below said temperature setpoint, to provide pulses from said other output terminal to the OFF input of the latching relay at a predetermined time interval shorter than the first-mentioned predetermined interval, and to provide said pulses at a pulse width increased over said predetermined pulse width.

14. The wall thermostat according to claim 1, said microprocessor further including a functionality operative, when there is a call for heating present and comfort space temperature is detected to be decreasing, to provide pulses from said one output terminal to the ON input of the latching relay at a predetermined time interval shorter than the first-mentioned predetermined interval, and to provide said pulses at a pulse width increased over said predetermined pulse width.

15. The wall thermostat according to claim 1, said microprocessor further including a functionality operative, when there is a call for cooling present and comfort space temperature is detected to be increasing, to provide pulses from said one output terminal to the ON input of the latching relay at a predetermined time interval shorter than the first-mentioned predetermined interval, and to provide said pulses at a pulse width increased over said predetermined pulse width.

16. The wall thermostat according to claim 1, said microprocessor further including a functionality operative, when there is no call for heating present and comfort space temperature is detected to be increasing, to provide pulses from said other output terminal to the OFF input of the latching relay at a predetermined time interval shorter than the first-mentioned predetermined interval, and to provide said pulses at a pulse width increased over said predetermined pulse width.

17. The wall thermostat according to claim 1, said microprocessor further including a functionality operative, when there is no call for cooling present and comfort space temperature is detected to be increasing, to provide pulses from said other output terminal to the OFF input of the latching relay at a predetermined time interval shorter than the first-mentioned predetermined interval, and to provide said pulses at a pulse width increased over said predetermined pulse width.

18. The wall thermostat according to claim 1, wherein said DC power source is comprised of one or more power cells.

* * * * *